United States Patent

[11] 3,567,003

| [72] | Inventors | Donald L. Towne<br>North Syracuse;<br>Robert L. Schaller, Camillus, N.Y. |
|---|---|---|
| [21] | Appl. No. | 769,604 |
| [22] | Filed | Oct. 22, 1968 |
| [45] | Patented | Mar. 2, 1971 |
| [73] | Assignee | Sundstrand-Engelberg, Inc. |

[54] BAR ACCUMULATING APPARATUS
4 Claims, 8 Drawing Figs.

[52] U.S. Cl............................................. 198/27,
198/127, 198/103
[51] Int. Cl........................................B65g 47/00,
B65g 13/02
[50] Field of Search............................ 198/20, 27,
103; 198/127, 105; 214/1 (B4), 1 (P)

[56] References Cited
UNITED STATES PATENTS
3,456,774  7/1969  Blickenderfer.............. 198/20

3,206,002  9/1965  Hartenstein.................. 198/105
FOREIGN PATENTS
1,150,693  8/1957  France........................ 198/27

*Primary Examiner*—Richard E. Aegerter
*Attorney*—Hofgren, Wegner, Allen, Stellman and McCord ABSTRACT: Apparatus for accumulating bars provided with a high finish. The finished bars are advanced on a linear series of guide rolls to a transfer position. Transfer means is power operated over an arcuate path to elevate a bar from the guide rolls, move it laterally and deposit the bar on a series of conveyors. The conveyors extend laterally from the series of guide rolls and are power operated, prior to the disposition of a bar thereon, to move the accumulated bars on a conveyor in a direction away from the guide rolls. The bars are handled without any sliding movement on the components of the apparatus.

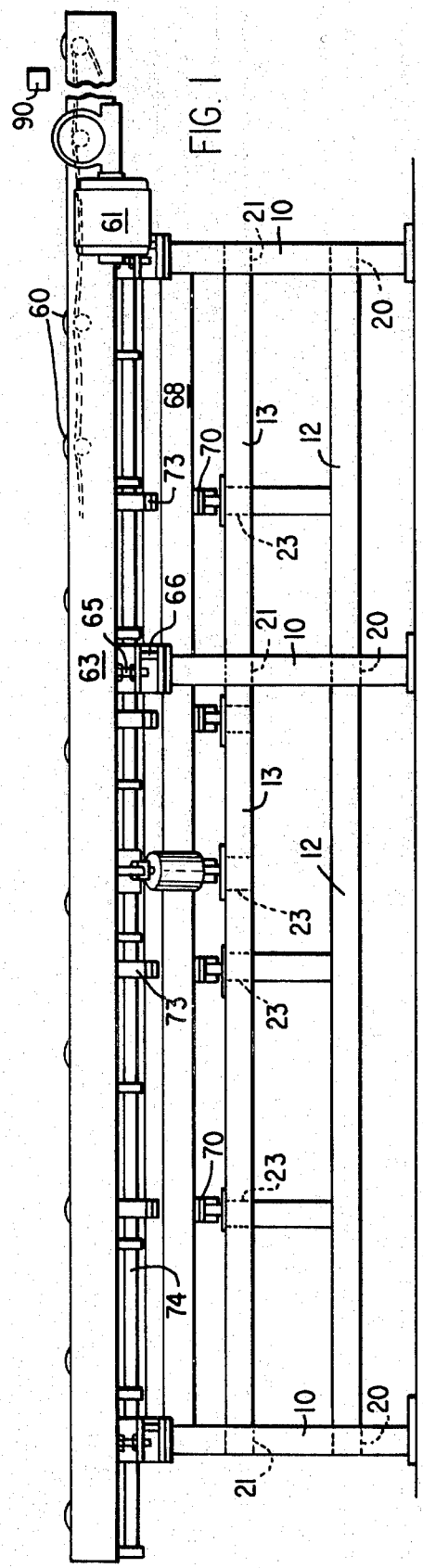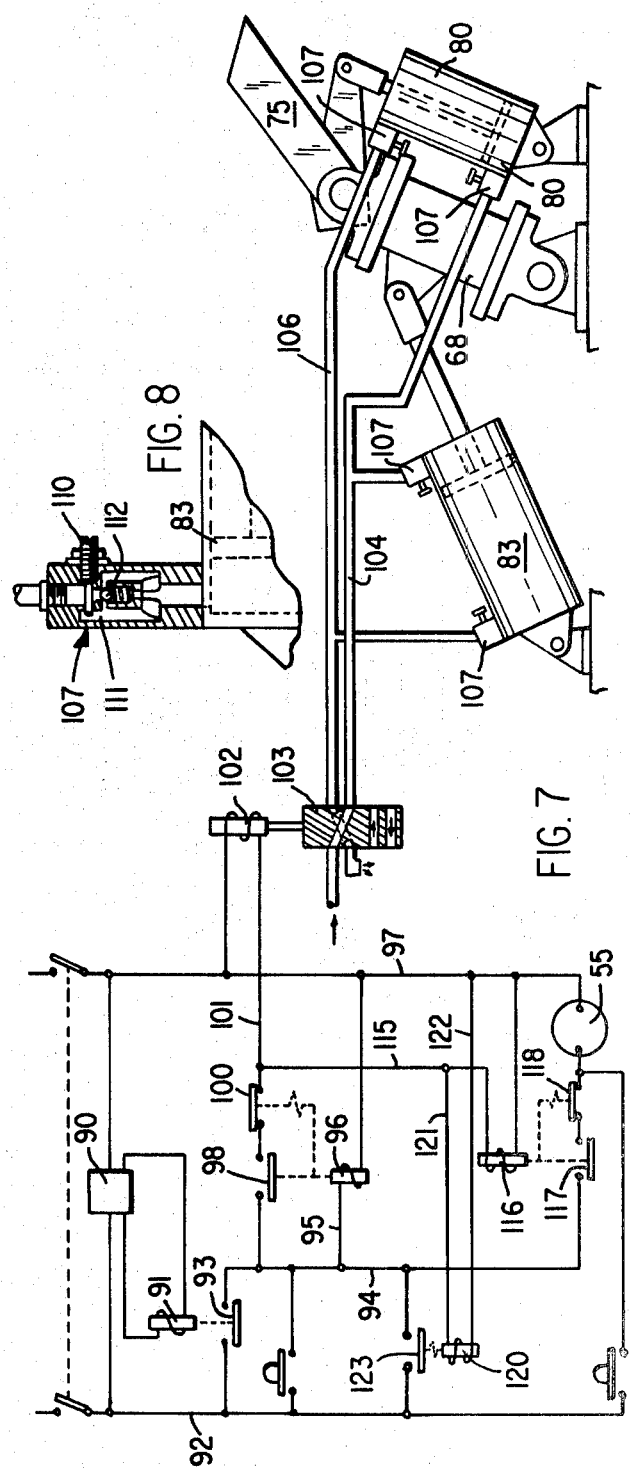
INVENTORS.
ROBERT L. SCHALLER.
DONALD L. TOWNE.
BY Hofgren, Wegner,
Allen, Stellman & McCord
Attys

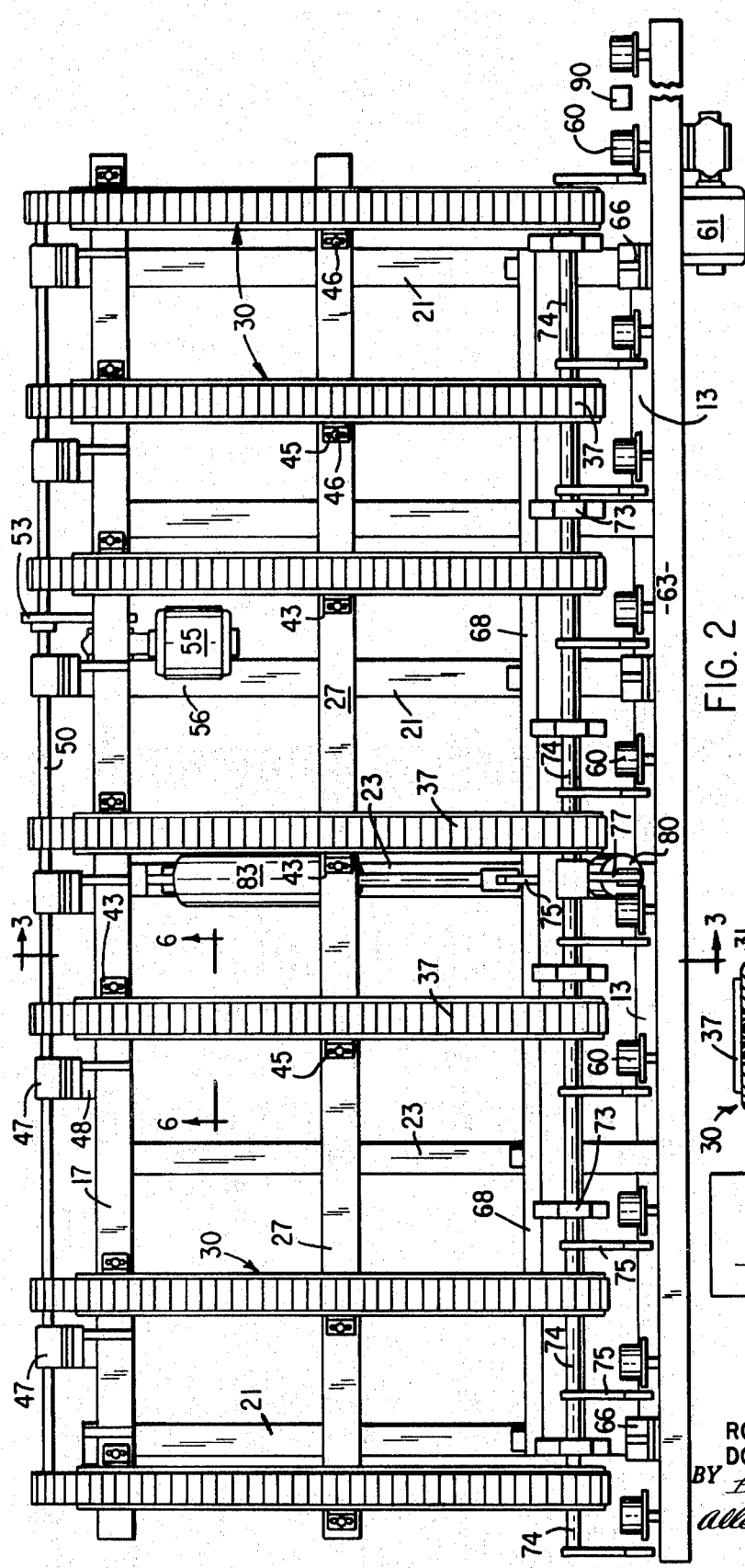

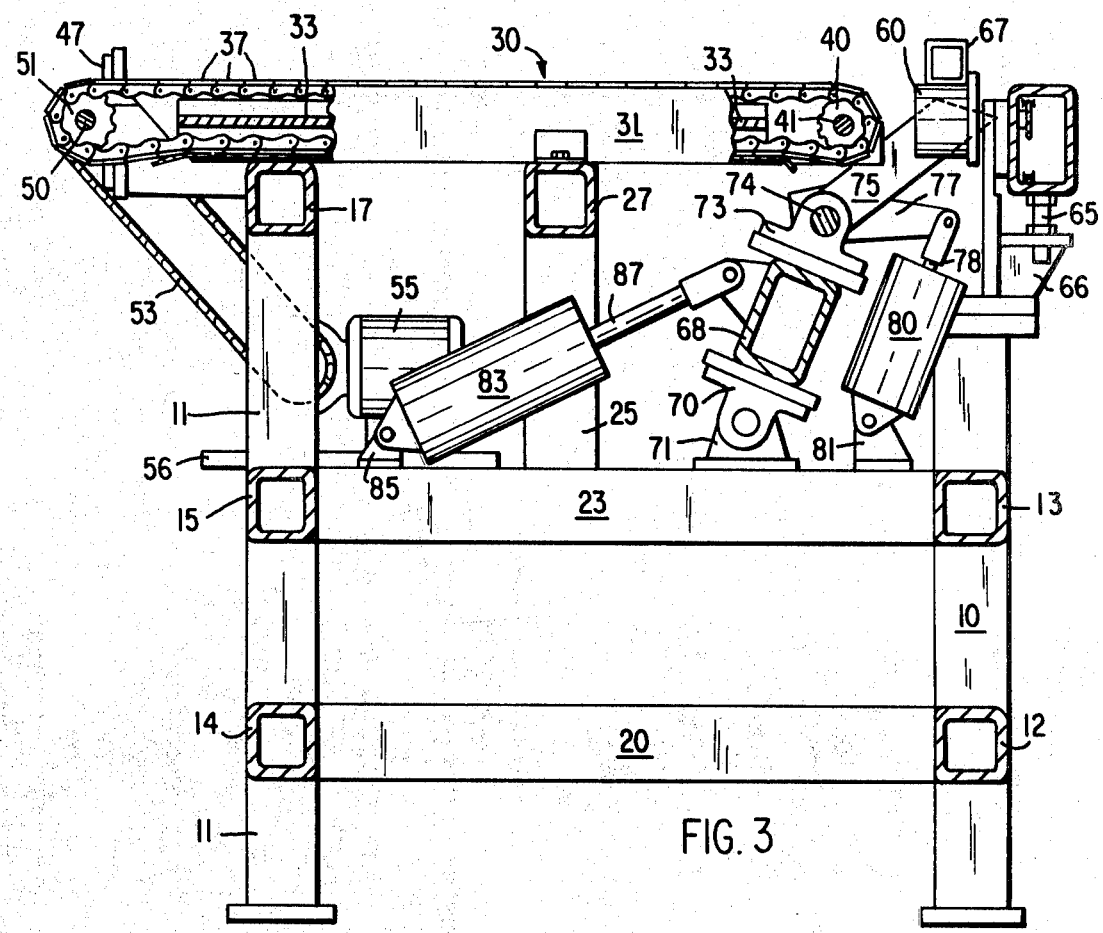
FIG. 3
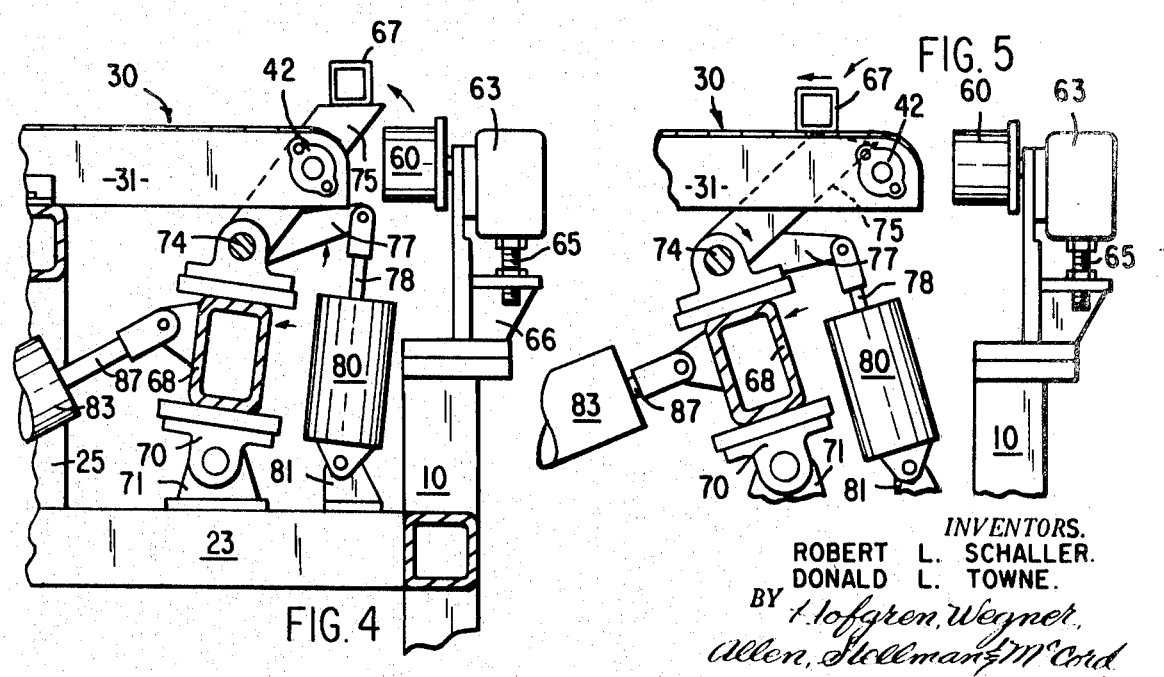
FIG. 4
FIG. 5
INVENTORS.
ROBERT L. SCHALLER.
DONALD L. TOWNE.

BAR ACCUMULATING APPARATUS

BRIEF SUMMARY OF THE INVENTION

The apparatus of this invention functions to accumulate elongated bars to which a very high mirrorlike finish has been imparted as, for example, by the machine disclosed in copending application Ser. No. 750,259 filed Aug. 5, 1968. These bars may be of circular cross section but, in most instances, they are of rectangular form and are made from material capable of accepting a high polish finish, such as stainless steel and aluminum. Such finished bars are not acceptable if they are in any way marred, or defaced, as by having scratches, or other blemishes, on their outer surfaces.

The apparatus of the invention functions to accumulate bars successively on a series of bar accumulating conveyors from which they are removed manually and provided with a protective wrapping for shipment.

BRIEF DESCRIPTION OF DRAWINGS

FIG. 1 is a front elevational view of the bar-handling apparatus embodying our invention.

FIG. 2 is a top plan view.

FIG. 3 is a view taken on line 3–3, FIG. 2.

FIG. 4 is a view, similar to FIG. 3, of the transfer mechanism in which the bar has been elevated from the feed rolls and moved laterally toward the conveyor.

FIG. 5 is a view, similar to FIG. 4, in which the bar has been deposited on the conveyors.

FIG. 6 is a view taken on line 6–6, FIG. 2.

FIG. 7 is a schematic diagram of the electrical and fluid control circuitry.

FIG. 8 is a sectional view of one of the flow control and check valves in the fluid circuitry.

DETAILED DESCRIPTION

The frame of the apparatus consists of vertically disposed front columns 10, and similar rear columns 11. Beams 12 and 13 extend between the front columns 10 and are fixed thereto at their ends. Beams 14 and 15 extend between the rear columns 11, and a beam 17 is fixed to the upper ends of the rear columns 11. Beams 20 extend transversely between the lower portions of the columns 10, 11, and beams 21 extend between the upper portions of the columns. In addition to the upper crossbeams 21, there are a number of additional crossbeams 23, these beams extending between the upper front beams 13 and the beams 15.

Posts 25 extend upwardly from the beams 21, 23 and support a lengthwise extending beam 27 arranged in the plane of beam 17. The beams 17, 27, support a series of bar storage conveyors indicated generally at 30. These conveyors have side frame members 31 of channel formation fixedly secured to the top and bottom flanges of an I-beam 33 maintaining the inwardly extending flanges of the channel members in spaced-apart relation for the passage of the lugs 35 of the chain conveyor, see FIG. 6. The lugs are attached to pads 37 which slide along the upper flanges of the side members and are formed of nonmarring material, such as plastic.

The I-beam 33 terminates inwardly from the ends of the side members, see FIG. 3. The conveyor chain is trained about sprockets 40 mounted on shafts 41 journaled in bearings 42 attached to the side members 31. The side members 31 are provided with angle brackets 43 positioned on the beams 17 and 27. The feet of the brackets are formed with elongated slots 45, see FIG. 2, for the reception of cap screws 46 threading into the beams. There are a plurality of bearing blocks 47 fixed to brackets 48 which, in turn, are fixed to the beams 17 and extend rearwardly therefrom. A shaft 50 is journaled in the bearing blocks 47 and is provided with driving sprockets 51. The sprockets 51 are fixed to the shaft 50 and are arranged in alignment with the sprockets 40. The shaft 50 is intermittently rotated in a counterclockwise direction, FIG. 3, by a chain drive 53 operated by a gear reduction motor 55 supported on a bracket 56 fixed to the intermediate crossbeam 21, see FIGS. 2 and 3.

The finished bars are advanced from the bar finishing machine along a linear series of guide rolls 60 extending in a direction normal to the conveyors. The rolls 60 are journaled in a beam 63 mounted on adjusting studs 65, see FIG. 3, which in turn are mounted on brackets 66 fixed to the tops of the front column 10. The rolls 60 are driven by a motor 61 and accordingly, serve as feed rolls. The forward ends of the conveyors 30 terminate in spaced relation to the linear series of rolls 60, and transfer means is provided for transferring the bars 67 from the rolls 60 to the conveyors 30. The transfer means is movable over an arcuate path to engage the under side of a bar on the rolls 60 and elevate it therefrom. The transfer members continue in the arcuate path to move the bar transversely and downwardly for deposit on the conveyors 30.

A beam 68 is fixed on blocks 70, FIGS. 3, 4 and 5, which, in turn, are pivotally mounted on brackets 71 fixed to the crossbeams 23. Bearing blocks 73 are fixed at spaced intervals to the top side of the beam 68. A shaft 74 is journaled in the bearing 73. A series of transfer arms 75 are fixed to the shaft 74. An arm 77 is also fixed to the shaft 74, the free end of the arm 77 being pivotally connected to the piston rod 78 mounted in cylinder 80. The lower end of the cylinder 80 is pivotally mounted on a bracket 81 fixed to the central crossbeam 23, see FIG. 2.

A cylinder 83 is pivotally mounted at one end to a bracket 85 also fixed to the crossbeam 23. The piston rod 87 of this cylinder is pivotally connected to the beam 68. Normally, the piston rod 87 is extended from the cylinder 83 to tilt the beam 68 toward the series of rolls 60. The piston rod 78 of cylinder 80 is normally retracted to position the free ends of the arms 75 beneath a bar 67 positioned on roll 60, as shown in FIG. 3. A sensor 90 is positioned at the right end of the series of rolls, see FIGS. 1 and 2. As the bar 67 is advanced by the rolls 60 to move the trailing end of the bar from under the sensor 90, relay 91 is energized, FIG. 7, completing a circuit from line 92, through closed contacts 93 of the relay, wires 94, 95, to coil of relay 96, to line 97. Energization of relay 96 effects closing of the contacts 98 thereof, completing a circuit from wire 94, through contacts 98, closed contacts 100, wire 101, to solenoid 102 of fluid valve 103, with return to the line 97. Energization of the solenoid 102 effects operation of the valve 103 to supply fluid pressure through line 104, to the upper end of cylinder 83 and to the lower end of cylinder 80. When solenoid 102 is deenergized, pressure is transferred to the line 106 to the lower end of cylinder 83, and the upper end of cylinder 80, the line 104 then being connected to exhaust.

Lines 104 and 106 are connected to the cylinders through combination flow control-check valves 107. Referring to FIG. 8, the valves 107 are provided with a needle adjustment 110 for controlling the flow of air from the cylinder through passage 111, to the line. Flow from the line to the cylinder is free through the check valve 112. The valve 107, at the lower end of cylinder 83, and the valve at the upper end of cylinder 80, are so adjusted that the exhaust from cylinder 80 has more free travel than the exhaust from cylinder 83 whereby, when valve 103 is actuated upon energization of solenoid 102, the piston in cylinder 80 moves upwardly at a more rapid rate than the piston and cylinder 83 moves downwardly. Accordingly, the transfer arms 75 are swung upwardly to raise the bar 67 from roll 60 prior to the movement of beam 68 by cylinder 83. This sequential movement is also accomplished in part by the fact that the stroke of cylinder 80 is shorter than the stroke of cylinder 83, and also partially due to the fact that less force is required to elevate the bar from the feed rolls than is required to move the beam 68. Accordingly, the piston and cylinder 80 moves upwardly rather rapidly to the end of its stroke, whereupon the pressure builds up in line 104, effecting downward movement of the piston in cylinder 83 and oscillation of the beam 68 in a clockwise direction, FIG. 7, to move the bar 67 laterally over the conveyors 30.

As previously stated, contacts 100 of relay 96 are timedelayed contacts, and the timing is such as to assure transfer of the bar from the feed rolls in position over the conveyors 30. When the contacts 100 time out and open, solenoid 102 is deenergized, effecting reversal of valve 103 to connect line 106 to pressure, and line 104 to exhaust. The flow control valve 107, connected to the lower end of the cylinder 80, is adjusted to permit greater flow of the exhaust from the cylinder than is the valve 107 connected to the upper end of cylinder 83. Accordingly, the piston in cylinder 80 moves downward rapidly moving the free ends of the transfer arms downwardly to the position shown in FIG. 5, for deposit of the bar 67 on the conveyors 30. Thereafter the pressure in cylinder 83 below the piston therein builds up to swing beam 68 in a clockwise direction for the return of the arms 75 to the position intermediate the rolls 60 and below a bar positioned thereon.

Referring again to FIG. 7, the closing of contacts 98, 100, also provide power through a line 115, to relay 116, closing contacts 117 to provide power from line 94 to motor 55 for actuating the conveyors to move the bars thereon in a direction away from the feed rolls 60. This circuit is established through time delay contacts 118. With this arrangement, the conveyor motor 55 is energized immediately upon the closing of contacts 98 to advance the bars accumulated on the conveyors to the left in FIG. 3. Contacts 118 are adjusted to time out prior to the deposit of the bar being transferred onto the conveyors. As previously stated, these bars are provided with a very high finish which is easily marred, or scratched, and if so, the bars become rejected. The operation of this bar-accumulating apparatus is such, as will be apparent, that at no time is any sliding movement imparted to the bars either on the feed rolls 60, or the conveyor pads 37.

Relay coil 120 is also energized through contacts 93, 98, 100, from wire 115, through wires 121, 122, to the return 97, closing contacts 123 which are time delayed contacts and which are timed to assure complete transfer of the bars 67 from rolls 60 to the conveyors 30. Referring to FIG. 7, it will be seen that these contacts 123 are connected in shunt with contacts 93. Accordingly, if a bar is being moved from the infeed rolls 60 toward the conveyors, and the leading end of another bar passes under the sensor 90, solenoid 91 would be deenergized, opening contacts 93 which, in the absence of contacts 123, would effect deenergization of the solenoid 102 and the reversal of valve 103, effecting reversal of cylinders 80 and 83, and returning the bar toward the rolls 60, which would result in a collision with the next approaching bar on rolls 60. By means of relay 120 with delay opening contacts 123, the transfer mechanism, when once initiated, will pass through a complete cycle.

Attention is called to the fact at the initial reversal of fluid supply to the cylinders 80, 83, for disposition of the transferred bar on the conveyors 30, the arms 75 are returned to their down position. Accordingly, when the beam 68 is swung toward the rolls 60, the free ends of the transfer arms 75 will pass under the next bar advancing on the rolls 60.

It will be apparent that when the trailing end of a bar has passed from under the sensor 90, the power means 80, 83, are operated through a cycle to impart arcuate movement of the free ends of the transfer arms 75 to first elevate a bar directly upwardly from the rolls 60 and thence move the elevated bar transversely and deposit it on the conveyors 30 and thereafter, the power means 80, 83, are reversely cycled to effect return of the arms 75 below the next bar advancing on the rolls 60.

We claim:

1. Mechanism for the accumulation of elongated bars comprising a frame, a linear series of bar guide rolls, a series of bar-accumulating conveyors spaced along said series of rolls and extending laterally therefrom, like ends of said conveyors being spaced laterally from said rolls, an elongated support member pivotally mounted on said frame on an axis extending in a direction lengthwise of said series of rolls and located below said like ends of the conveyors, a series of transfer arms mounted on said support for pivotal movement about an axis extending parallel to said support pivot axis, the free ends of said arms being normally positioned intermediate said rolls below a bar positioned thereon, reversible power means connected to said support and said arms, and a control circuit including means for controlling the reversible power means and operable to effect upward movement of said arms about their pivotal mounting to elevate a bar from said rolls followed by lateral movement of said support and arms toward said conveyors to deposit the bar thereon and effect return movement of said arms to normal position.

2. Mechanism as set forth in claim 1 and including power means operable to effect movement of said conveyors in a direction away from said rolls prior to the transfer of each bar from said rolls to said conveyors, said power means being inoperable during deposit of the bar on said conveyors.

3. Mechanism for accumulating elongated bars comprising a frame, a linear series of bar-supporting guide rolls mounted on said frame, power means operable to effect advancement of a bar along said rolls to a transfer position, a series of conveyors spaced along said series of rolls and extending laterally therefrom, like ends of said conveyors terminating adjacent said series of rolls, a support extending in a direction lengthwise of said series of rolls and being mounted on the frame for pivotal oscillation toward and from said rolls, the axis of said pivotal mounting being located below said like ends of the conveyors, a series of transfer arms pivotally mounted at like ends to said support, said arms normally extending toward said rolls with the free ends of said arms positioned intermediate said rolls below a bar positioned thereon, first reversible power means connected to said arms and operable to effect upward movement of the free ends thereof for elevation of a bar from said rolls, a second reversible power means connected to said support and operable to move the same in a direction away from said series of rolls for transfer of said elevated bar over said conveyors, a control circuit for said first and second reversible power means including means for timing said reversible power means to have the arms move upwardly before the support moves to assure initial lift of a bar, said power means being reversible to return the free ends of said arms to normal position, and means operable to move said conveyors in a direction away from said rolls.

4. Mechanism as defined in claim 3, wherein said control circuit further includes means to cause lowering of said transfer arms to transfer a bar onto said conveyors prior to reversing movement of said support to return said arms to normal position.